US008966652B2

(12) United States Patent
Brown et al.

(10) Patent No.: US 8,966,652 B2
(45) Date of Patent: Feb. 24, 2015

(54) SOFTWARE UTILIZATION PRIVILEGE BROKERING IN A NETWORKED COMPUTING ENVIRONMENT

(75) Inventors: Gene L. Brown, Durham, CT (US); Brendan F. Coffey, Rhinebeck, NY (US); Christopher J. Dawson, Arlington, VA (US); Clifford V. Harris, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 13/155,564

(22) Filed: Jun. 8, 2011

(65) Prior Publication Data

US 2012/0317648 A1 Dec. 13, 2012

(51) Int. Cl.
*G06F 21/10* (2013.01)
*G06F 9/445* (2006.01)
*H04L 29/06* (2006.01)

(52) U.S. Cl.
CPC ............... *G06F 21/105* (2013.01); *G06F 8/60* (2013.01); *H04L 63/102* (2013.01); *H04L 63/20* (2013.01)
USPC ...................... 726/28; 726/4; 726/26; 726/27

(58) Field of Classification Search
CPC ....... G06F 9/5083; G06F 21/105; G06F 8/60; G06F 21/10; G06Q 30/02; H04L 63/12; H04L 63/20; H04L 41/50; H04L 63/102; H04L 63/107
USPC ............................................ 726/26–28, 32, 4
See application file for complete search history.

(56) References Cited

U.S. PATENT DOCUMENTS

| 7,636,693 | B2 | 12/2009 | Faur et al. | |
|---|---|---|---|---|
| 2008/0065641 | A1* | 3/2008 | Martin et al. | 707/9 |
| 2008/0083025 | A1 | 4/2008 | Meijer et al. | |
| 2008/0083040 | A1 | 4/2008 | Dani et al. | |
| 2008/0091613 | A1 | 4/2008 | Gates et al. | |
| 2009/0307685 | A1* | 12/2009 | Axnix et al. | 717/174 |
| 2010/0293049 | A1* | 11/2010 | Maher et al. | 705/14.46 |
| 2011/0047540 | A1 | 2/2011 | Williams et al. | |
| 2011/0131134 | A1* | 6/2011 | Ferris et al. | 705/40 |
| 2012/0284105 | A1* | 11/2012 | Li | 705/14.23 |

OTHER PUBLICATIONS 6.1 Cloud Management Broker, Nist, Nov. 6, 2010, https://web.archive.org/web/20101106220404/http://www.nist.gov/itl/cloud/6_1.cfm.*
Maitland, J., "Keeping Control Isn't Easy", Chapter 4: Cloud-Based Infrastructure, SearchCloudComputing.com, 13 pages.

(Continued)

*Primary Examiner* — Kambiz Zand
*Assistant Examiner* — Ayoub Alata
(74) *Attorney, Agent, or Firm* — William E. Schiesser; Maxine L. Barasch; Keohane & D'Alessandro PLLC

(57) ABSTRACT

Embodiments of the present invention provide a subscription service for documenting, verifying, administering, and auditing use of entitled software products in third-party networked computing environments (e.g., a cloud computing environment). Specifically, aspects of the invention provide an Entitlement Brokering System (EBS) (also referred to as an entitlement broker) that reduces the risk associated with clients improperly running licensed software products on their computing infrastructure, thus increasing the reliability and auditability of the software product's entitlement status and accelerating intake of new or existing clients through automation of the entitlement verification process.

13 Claims, 5 Drawing Sheets

(56) References Cited

OTHER PUBLICATIONS

Mell et al., "The NIST Definition of Cloud Computing", National Institute of Standards and Technology, Information Technology Laboratory, Version 15, Oct. 7, 2009, 2 pages.

"HPC in the Cloud", Amazon web services, 9 pages. No authors cited. http://www.hpcinthecloud.com/hpccloud/2011-03-01/safenet_announces_industry_s_first_ . . . .

"SLPS Software Licensing & Protection Services for ISVs", Microsoft.com, copyright 2011, 2 pages. No authors cited. http://pinpoint.microsoft.com/en-us/applications/slps-software-licensing-protection-service . . . .

"Sentinel Cloud Services", Safenet-inc.com, copyright 2011, 1 page. No authors cited. http://www.safenet-inc.com/solutions/software/sentinel-cloud-services-overview/.

* cited by examiner

SOFTWARE UTILIZATION PRIVILEGE BROKERING IN A NETWORKED COMPUTING ENVIRONMENT

TECHNICAL FIELD

The present invention generally relates to software utilization privileges (referred to herein as "entitlement"). Specifically, the present invention relates to software entitlement brokering in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

As more diverse computing workloads and services are delivered in a cloud computing environment, challenges are presented when attempting to ensure entitlement for usage of any given software product. Business entities may face risks when accessing software products without verifying their right to use and/or with limited controls on usage. In traditional computing configurations, a consumer may license computing software products and execute them on a computing infrastructure. However, in a cloud computing environment, where the computing infrastructure may be owned and managed by one or more third-party service providers, the transfer of new or existing software product entitlements into this domain for use by the licensee is constrained by the lack of federated identify management systems. As such, challenges may exist with respect to ensuring compliance with the terms and conditions of extant software licenses.

SUMMARY

Embodiments of the present invention provide a subscription service for documenting, verifying, administering, and auditing use of entitled software products in third-party networked computing environments (e.g., a cloud computing environment). Specifically, aspects of the invention provide an Entitlement Brokering System (EBS) (also referred to as an entitlement broker) that reduces the risk associated with clients improperly running licensed software products on their computing infrastructure, thus increasing the reliability and auditability of the software product's entitlement status and accelerating intake of new or existing clients through automation of the entitlement verification process.

A first aspect of the present invention provides a method for managing software entitlements in a networked computing environment, comprising: receiving a registration request from a requester on an entitlement broker for registering a software product; receiving a deployment request from the requester on the entitlement broker to deploy the software product in the networked computing environment; verifying, on the entitlement broker, an entitlement of the requester to deploy the software product in the networked computing environment; and deploying the software product in the networked computing environment via the entitlement broker if the entitlement is verified.

A second aspect of the present invention provides a system for managing software entitlements in a networked computing environment, comprising: a bus; a processor coupled to the bus; and a memory medium coupled to the bus, the memory medium comprising instructions to: receive a registration request from a requester on an entitlement broker for registering a software product; receive a deployment request from the requester on the entitlement broker to deploy the software product in the networked computing environment; verify, on the entitlement broker, an entitlement of the requester to deploy the software product in the networked computing environment; and deploy the software product in the networked computing environment via the entitlement broker if the entitlement is verified.

A third aspect of the present invention provides a computer program product for managing software entitlements in a networked computing environment, the computer program product comprising a computer readable storage media, and program instructions stored on the computer readable storage media, to: receive a registration request from a requester on an entitlement broker for registering a software product; receive a deployment request from the requester on the entitlement broker to deploy the software product in the networked computing environment; verify, on the entitlement broker, an entitlement of the requester to deploy the software product in the networked computing environment; and deploy the software product in the networked computing environment via the entitlement broker if the entitled is verified.

A fourth aspect of the present invention provides a method for deploying a system for managing software entitlements in a networked computing environment, comprising: providing a computer infrastructure being operable to: receive a registration request from a requester on an entitlement broker for registering a software product; receive a deployment request from the requester on the entitlement broker to deploy the software product in the networked computing environment; verify, on the entitlement broker, an entitlement of the requester to deploy the software product in the networked computing environment; and deploy the software product in the networked computing environment via the entitlement broker if the entitled is verified.

BRIEF DESCRIPTION OF THE DRAWINGS

These and other features of this invention will be more readily understood from the following detailed description of the various aspects of the invention taken in conjunction with the accompanying drawings in which.

Figure 1:
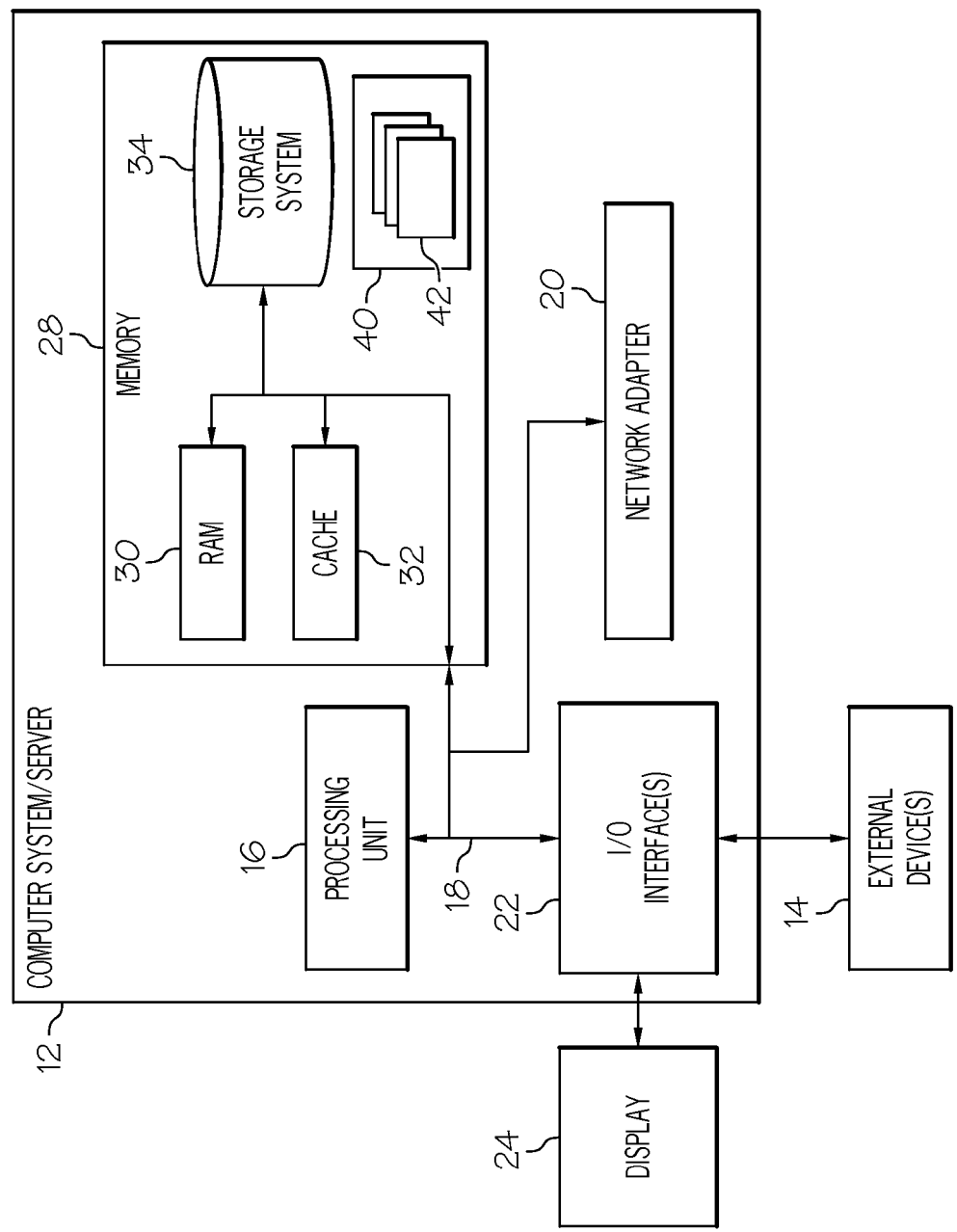
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide a subscription service for documenting, verifying, administering, and auditing use of entitled software products in third-party networked computing environments (e.g., a cloud computing environment). Specifically, aspects of the invention provide an Entitlement Brokering System (EBS) (also referred to as an entitlement broker) that reduces the risk associated with clients improperly running licensed software products on their computing infrastructure, thus increasing the reliability and auditability of the software product's entitlement status and accelerating intake of new or existing clients through automation of the entitlement verification process.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
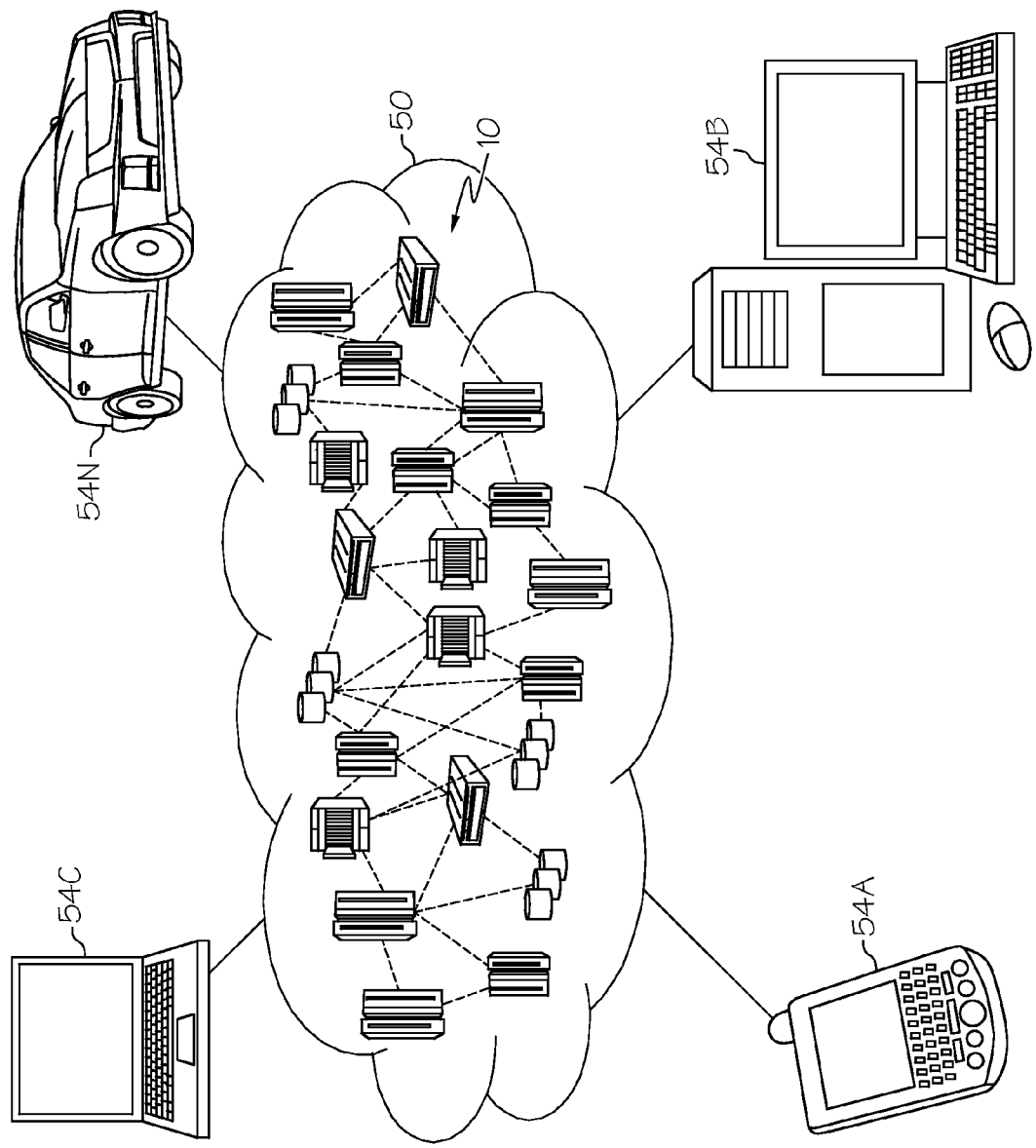
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
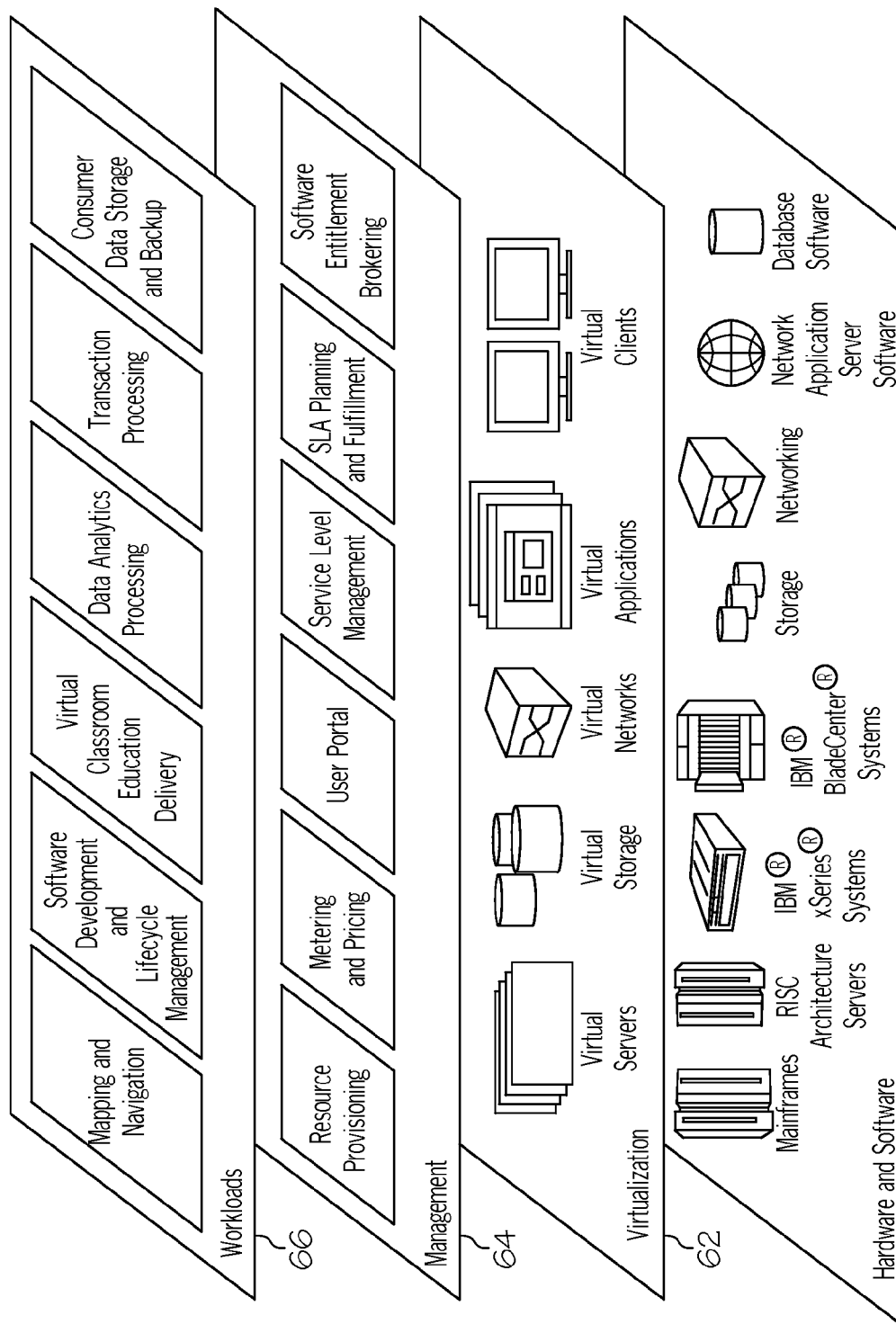
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is software entitlement brokering, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the software entitlement brokering functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

As indicated above, embodiments of the present invention describe a brokering mechanism that functions as a subscription service for documenting, verifying, administering, and auditing use of entitled software products in third-party environments (e.g., cloud computing). Specifically, embodiments of the invention provide an entitlement broker that allows a cloud service provider to reduce the risk associated with clients running licensed software products on their computing infrastructure, thus increasing the reliability and auditability of said software product's entitlement status and accelerating intake of new or existing clients through automation of the entitlement verification processing.

Without the entitlement broker, potential clients may be required to provide documentation of their entitlement for use of software products via inefficient methods (e.g., faxing and emailing license agreements, resubmitting documents when license changes occur or when the cloud service terminates and restarts as a result of dynamic subscription models). Moreover, without the entitlement broker, cloud service providers need to provide due diligence to mitigate the risk that a client might be using software products on the service provider's infrastructure without adequate entitlement to those products. To mitigate this risk, service providers may limit the number or types of software products they will support or seek to introduce additional process measures on their clients to ensure compliance, both of which potentially inhibit revenue streams for the cloud service.

Embodiments of the present invention define and implement an entitlement broker that provides a service requestor interface for software product owners, consumers, and cloud service providers in support of their software entitlement needs. A typical scenario for both traditional and cloud infrastructure entitlements lacked an entitlement broker. Under the traditional scenario, software product owners sell their software products to consumers and/or businesses, and, in the process, they entitle them to use their software according to the terms of their license agreement(s). As the entitled software is subsequently deployed by the consumer or business onto their private information technology (IT) infrastructure, they are able to use their existing governance processes to manage their software entitlements effectively. In the cloud infrastructure scenario, the entitled software is deployed onto a cloud service provider's IT infrastructure (third party) either by the consumer, business, or the cloud service provider. This potentially introduces risk to the consumer or business, whereby they cannot effectively manage how and where their entitled software is deployed by the cloud service provider risk is introduced to the cloud service provider such that they may have difficulty confirming and managing entitlement for software on behalf of any cloud client (e.g., consumer or business).

Figure 4:
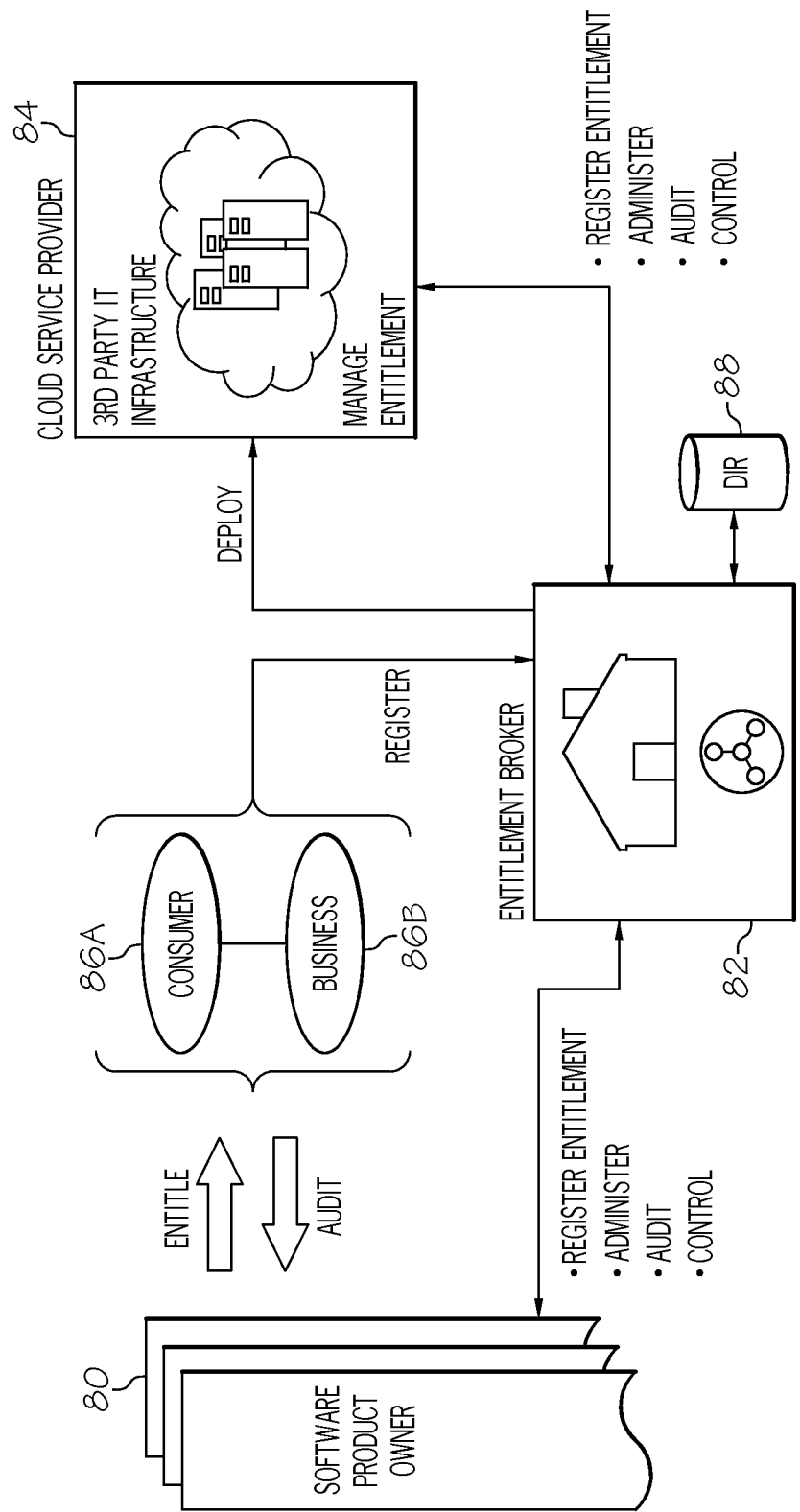
FIG. 4 depicts a system diagram according to an embodiment of the present invention.

Referring to FIG. 4, the approach provided under the embodiments of the present invention is depicted. Specifically, FIG. 4 represents a system diagram showing a process in which entitlement broker 82 introduces improved functionality for software entitlement in a cloud computing environment. In a typical embodiment, entitlement broker 82 can comprise a rules engine or the like that fosters communication between software product owner 80, consumer 86A, business 86B (collectively referred to as requesters), and cloud service provider 84 to: receive and process registration and/or audit requests (e.g., at predetermined time frames) to ensure compliance with service level agreements (SLAs) and/or software licenses; receive and process requests for deployment of a software product in a cloud computing environment; verify an entitlement for a software program to be deployed on a cloud infrastructure; deploy software products on in a cloud computing environment, etc.

Specifically, entitlement broker 82 provides an independent directory/registry 88 for software entitlement that allows software product owner 80, consumer 86A and business 85B, and cloud service provider 84 to register entitlement for a software product. Once a software product is registered in the entitlement broker 82, additional functions can also be provided in terms of support for administering, auditing, and controlling the registered software, which may be performed via trusted electronic interfaces provided by the entitlement broker.

In an illustrative scenario, consumer 86A or business 86B will register their entitlement status for any particular software product (from software provider 80) with an entitlement broker 82. In a typical embodiment, there can be no limit on how many consumers 86B or businesses 86B can plan such deployment of the cloud computing infrastructure in which they are participating. Cloud service provider 84 will then deploy the software product onto their cloud infrastructure on behalf of a consumer 86A or business 86B and can interact with entitlement broker 82 to perform the registration for this software product. Cloud service provider 84 can interact with entitlement broker 82 to perform additional administration activities, such as requesting details on license use terms; perform auditing of specific entitlement according to specific time-frames or via event-driven tasks, and, where necessary, control activities can be effected via entitlement broker 82 (e.g., as restrictions of usage, removal from registry, etc.). Software product owner 80 can also use entitlement broker 82 to perform similar activities as cloud service provider 84. In one embodiment, software product owner 80 can gain accelerated adoption and use of their software in cloud computing environments by registering entitlement via entitlement broker 82 at the time any original entitlement is conveyed to a consumer or businesses 86A and 86B. Software product owners also can use entitlement broker 82 to audit and control usage of their products.

Figure 5:
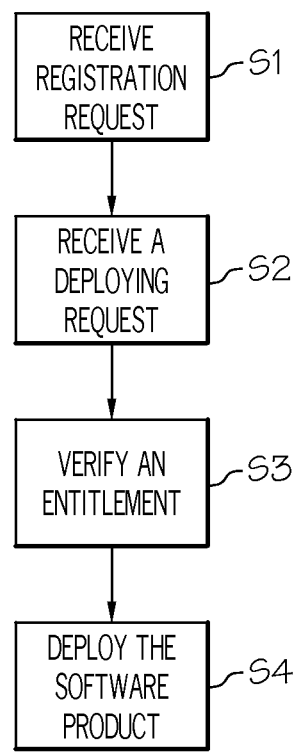
FIG. 5 depicts a method flow diagram according to an embodiment of the present invention.

These concepts will be further discussed in conjunction with the method flow diagram of FIG. 5. As shown, in step S1, a registration request is received from a requester on an entitlement broker for registering a software product. In step S2, a deployment request is received from the requester on the entitlement broker to deploy the software product in the networked computing environment. In step S3, an entitlement of the requester to deploy the software product in the networked computing environment is verified on the entitlement broker. In general, verification can comprise sending a verification request from the entitlement broker to an owner of the software product, and receiving a response to the verification request on the entitlement broker from the owner. Along these lines, the response can be based on a software license associated with the software product and/or a service level agreement between the requester and an owner of the software product. In step S4, the software product is deployed in the networked computing environment via the entitlement broker if the entitled is verified. Although not depicted, the deployment of the software in the networked computing environment can be audited (e.g., at predetermined time frames) for compliance with the license and/or SLA terms.

While shown and described herein as a software entitlement brokering solution, it is understood that the invention further provides various alternative embodiments. For example, in one embodiment, the invention provides a computer-readable/useable medium that includes computer program code to enable a computer infrastructure to provide software entitlement brokering functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide software entitlement brokering functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for software entitlement brokering. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

The invention claimed is:

1. A method for managing software entitlements in a networked cloud computing environment, comprising:
    receiving a first registration request from a first requester on an entitlement broker for registering a first software product;
    receiving a first deployment request from the first requester on the entitlement broker to deploy the first software product in the networked cloud computing environment on a first cloud infrastructure provided by a first cloud provider;
    verifying, on the entitlement broker, a first entitlement of the first requester to deploy the first software product in the networked cloud computing environment, the verifying comprising:
    sending a first verification request from the entitlement broker to a first software product owner, and receiving a first response at the entitlement broker from the first software product owner;
    deploying the first software product on the first cloud infrastructure in the networked cloud computing environment via the entitlement broker if the first entitlement is verified;
    auditing, via the entitlement broker, the first entitlement to the deployed first software product;
    receiving a second registration request from a second requester on the entitlement broker for registering a second software product;
    receiving a second deployment request from a second requester on the entitlement broker to deploy the second software product in the networked cloud computing environment on a second cloud infrastructure provided by a second cloud provider;
    verifying on the entitlement broker, a second entitlement of the second requester to deploy the second software product in the networked cloud computing environment, the verifying comprising:
    sending a second verification request from the entitlement broker to a second software product owner, and receiving a second response at the entitlement broker from the second software product owner;
    deploying the second software product on the second cloud infrastructure in the networked cloud computing environment via the entitlement broker if the second entitlement is verified; and auditing, via the entitlement broker, the second entitlement to the deployed second software product;
    wherein the entitlement broker is a separate entity from the first requester and the second requester; and
    wherein the cloud computing environment comprises a shared pool of configurable computing resources, which can be dynamically provisioned and released based on demand, and dynamically assigned and reassigned according to the demand.

2. The method of claim 1, the first response being based on a first software license associated with the first software product, and the second response being based on a second software license associated with the second software product.

3. The method of claim 1, the first response being based on a first service level agreement between the first requester and the first owner of the first software product, and the second response being based on a second service level agreement between the second requester and the second owner of the second software product.

4. The method of claim 1, the auditing being based on at least one time frame.

5. A system for managing software entitlements in a networked cloud computing environment, comprising: a bus;
    a processor coupled to the bus; and
    a memory medium coupled to the bus, the memory medium comprising instructions to:
    receive a first registration request from a first requester on an entitlement broker for registering a first software product;
    receive a first deployment request from the first requester on the entitlement broker to deploy the first software product in the networked cloud computing environment on a first cloud infrastructure provided by a first cloud provider;
    verify, on the entitlement broker, a first entitlement of the first requester to deploy the first software product in the networked cloud computing environment, the verifying comprising:
    send a first verification request from the entitlement broker to a first software product owner, and receive a first response at the entitlement broker from the first software product owner;
    deploy the first software product on the first cloud infrastructure in the networked cloud computing environment via the entitlement broker if the first entitlement is verified;
    audit, via the entitlement broker, the first entitlement to the deployed first software product;
    receive a second registration request from a second requester on the entitlement broker for registering a second software product;
    receive a second deployment request from a second requester on the entitlement broker to deploy the second software product in the networked cloud computing environment on a second cloud infrastructure provided by a second cloud provider;
    verify on the entitlement broker, a second entitlement of the second requester to deploy the second software product in the networked cloud computing environment, the verifying comprising:
    send a second verification request from the entitlement broker to a second software product owner, and receive a second response at the entitlement broker from the second software product owner;

deploy the second software product on the second cloud infrastructure in the networked cloud computing environment via the entitlement broker if the second entitlement is verified; and audit, via the entitlement broker, the second entitlement to the deployed second software product;

wherein the entitlement broker is a separate entity from the first requester and the second requester; and wherein the networked cloud computing environment comprises a shared pool of configurable computing resources, which can be dynamically provisioned and released based on demand, and dynamically assigned and reassigned according to the demand.

6. The system of claim 5, the first response being based on a first software license associated with the first software product, and the second response being based on a second software license associated with the second software product.

7. The system of claim 5, the first response being based on a first service level agreement between the first requester and the first owner of the first software product, and the second response being based on a second service level agreement between the second requester and the second owner of the second software product.

8. The system of claim 5, the auditing being based on at least one time frame.

9. A computer program product for managing software entitlements in a networked cloud computing environment, the computer program product comprising a computer readable storage device, and program instructions stored on the computer readable storage device, to:

receive a first registration request from a first requester on an entitlement broker for registering a first software product;

receive a first deployment request from the first requester on the entitlement broker to deploy the first software product in the networked cloud computing environment on a first cloud infrastructure provided by a first cloud provider;

verify, on the entitlement broker, a first entitlement of the first requester to deploy the first software product in the networked cloud computing environment, the verifying comprising:

send a first verification request from the entitlement broker to a first software product owner, and receive a first response at the entitlement broker from the first software product owner;

deploy the first software product on the first cloud infrastructure in the networked cloud computing environment via the entitlement broker if the first entitlement is verified;

audit, via the entitlement broker, the first entitlement to the deployed first software product;

receive a second registration request from a second requester on the entitlement broker for registering a second software product;

receive a second deployment request from a second requester on the entitlement broker to deploy the second software product in the networked cloud computing environment on a second cloud infrastructure provided by a second cloud provider;

verify on the entitlement broker, a second entitlement of the second requester to deploy the second software product in the networked cloud computing environment, the verifying comprising:

send a second verification request from the entitlement broker to a second software product owner, and receive a second response at the entitlement broker from the second software product owner;

deploy the second software product on the second cloud infrastructure in the networked cloud computing environment via the entitlement broker if the second entitlement is verified;

audit, via the entitlement broker, the second entitlement to the deployed second software product;

wherein the entitlement broker is a separate entity from the first requester and the second requester; and wherein the networked cloud computing environment comprises a shared pool of configurable computing resources, which can be dynamically provisioned and released based on demand, and dynamically assigned and reassigned according to the demand.

10. The computer program product of claim 9, the first response being based on a first software license associated with the first software product, and the second response being based on a second software license associated with the second software product.

11. The computer program product of claim 9, the first response being based on a first service level agreement between the first requester and the first owner of the first software product, and the second response being based on a second service level agreement between the second requester and the second owner of the second software product.

12. The computer program product of claim 9, the auditing being based on at least one time frame.

13. A method for deploying a system for managing software entitlements in a networked cloud computing environment, comprising:

providing a computer infrastructure being operable to:

receive a first registration request from a first requester on an entitlement broker for registering a first software product;

receive a first deployment request from the first requester on the entitlement broker to deploy the first software product in the networked cloud computing environment on a first cloud infrastructure provided by a first cloud provider;

verify, on the entitlement broker, a first entitlement of the first requester to deploy the first software product in the networked cloud computing environment, the verifying comprising:

send a first verification request from the entitlement broker to a first software product owner, and receive a first response at the entitlement broker from the first software product owner;

deploy the first software product on the first cloud infrastructure in the networked cloud computing environment via the entitlement broker if the first entitlement is verified;

audit, via the entitlement broker, the first entitlement to the deployed first software product;

receive a second registration request from a second requester on the entitlement broker for registering a second software product;

receive a second deployment request from a second requester on the entitlement broker to deploy the second software product in the networked cloud computing environment on a second cloud infrastructure provided by a second cloud provider;

verify on the entitlement broker, a second entitlement of the second requester to deploy the second software product in the networked cloud computing environment, the verifying comprising:

send a second verification request from the entitlement broker to a second software product owner, and receive a second response at the entitlement broker from the second software product owner;

deploy the second software product on the second cloud infrastructure in the networked cloud computing environment via the entitlement broker if the second entitlement is verified; and audit, via the entitlement broker, the second entitlement to the deployed second software product;

wherein the entitlement broker is a separate entity from the first requester and the second requester; and wherein the networked cloud computing environment comprises a shared pool of configurable computing resources, which can be dynamically provisioned and released based on demand, and dynamically assigned and reassigned according to the demand.

* * * * *